June 7, 1966 C. S. HERRICK ETAL 3,254,852

TAPE TRANSPORT ARRANGEMENT FOR A LIGHT VALVE APPARATUS

Filed Oct. 25, 1963 2 Sheets-Sheet 1

INVENTORS:
VON C. CAMPBELL,
CARLYLE S. HERRICK,
BY Frank J. Thompson
THEIR ATTORNEY.

June 7, 1966 C. S. HERRICK ETAL 3,254,852

TAPE TRANSPORT ARRANGEMENT FOR A LIGHT VALVE APPARATUS

Filed Oct. 25, 1963 2 Sheets-Sheet 2

INVENTORS:
VON C. CAMPBELL,
CARLYLE S. HERRICK,
BY Frank J. Thompson
THEIR ATTORNEY.

United States Patent Office 3,254,852
Patented June 7, 1966

3,254,852

TAPE TRANSPORT ARRANGEMENT FOR A LIGHT VALVE APPARATUS

Carlyle S. Herrick, Alplaus, and Von C. Campbell, Syracuse, N.Y., assignors to General Electric Company, a corporation of New York Filed Oct. 25, 1963, Ser. No. 318,906
9 Claims. (Cl. 242—55)

Figures 1, 2, 3:
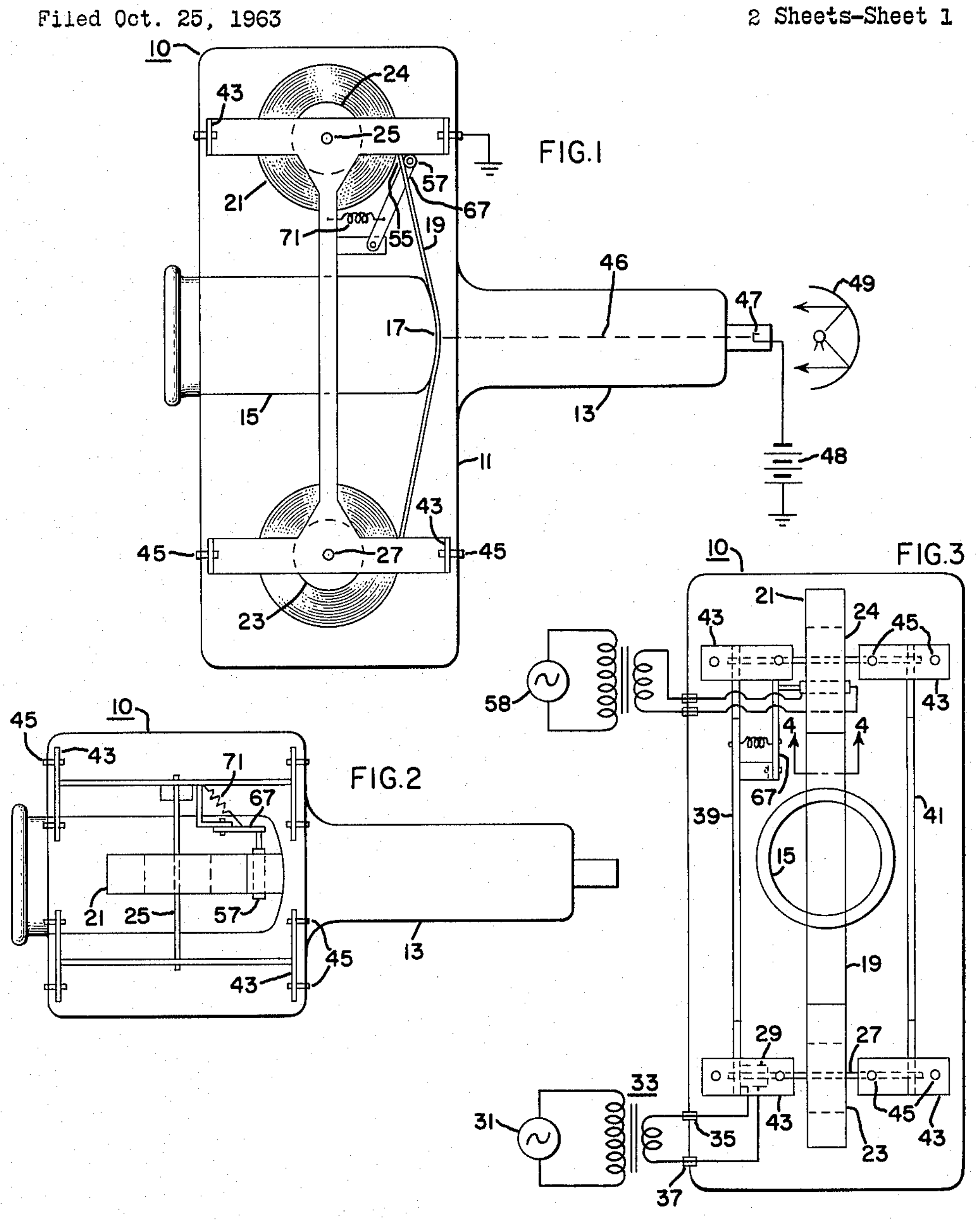

This invention relates to a light valve apparatus of the type having a tape transport arrangement for transporting a deformable medium to an operating station of the apparatus. The invention relates more particularly to an improved tape transport arrangement.

In a known light valve apparatus, an electron beam is modulated and scanned across the surface of a deformable medium to form gratings in the surface of the medium. A Schlieren optical system and a light source are provided and light rays from the source are projected upon the surface of the deformable medium and then onto a viewing screen where an image representative of the modulating intelligence is reproduced.

After repeated bombardment by the electron beam, presently known deformable mediums exhibit irradiation damage which is characterized by irregularities such as gelations and by other chemical damage in the body of the medium. These irregularities interfere with the faithful reproduction of the image. By continuously replenishing the medium in the area of electron impingement, this adverse effect can be reduced.

A proposed arrangement for replenishing the medium utilizes a strip of transparent tape having a transparent deformable medium coated on the surface thereof. The strip of tape which is wound into a supply roll is adapted to be unwound and drawn past a station of the apparatus. As the tape is drawn past the station, a scanning electron beam impinges and forms gratings in the surface. The medium is thus continuously replenished in the area of beam impingement.

In prior tape transport arrangements of this type, the deformable medium comprised a material having the consistency of a light oil. The viscosity of the medium at 25° C. has generally been less than $1 \times 10^6$ centistoke. Several advantages accrue from the use of a medium having a viscosity at 25° C. which is relatively greater than previously utilized mediums. These advantages include improved storing and handling characteristics for the tape and the extended useful life of the medium under electron bombardment. However, the greater viscosity of the medium, although advantageously contributing to increased mechanical rigidity of a wound reel of tape, substantially increases the force which is required for unwinding the tape. Hence, tape winding apparatus of greater complexity, size, and cost is required to effect the transport of the tape. In addition, rivulets and other undesirable deformations are often created in the medium as a result of the greater force required to separate a lead turn being unrolled from an adjacent turn. Furthermore, certain mediums which are desirable for use in a light valve apparatus have a particularly high viscosity at 25° C. These latter mediums establish forces between different turns of the reel of tape which are of a magnitude for causing the reel of tape to assume the form of a solid integral unit and which cannot be unwound without seriously damaging or even destroying the tape.

Accordingly, it is an object of this invention to provide an arrangement for facilitating the unwinding of a strip of tape having a deformable medium coated thereon.

Another object of this invention is to provide an arrangement which facilitates the unwinding of a tape having a deformable medium of relatively high viscosity coated thereon.

Another object of this invention is to provide an arrangement for reducing the force required to unwind a reel of tape having a deformable medium of relatively high viscosity coated thereon.

A further object of the invention is to provide an improved tape reel unwinding arrangement which provides for the unwinding of a reel of tape having a relatively high viscosity medium coated thereon while inhibiting the creation of rivulets and other deformations in the medium.

It is desirable to provide in a light valve apparatus, a relatively uncomplex tape transport arrangement which includes means for controlling the rate at which the tape is unwound and transported.

Another object of the present invention is to provide a tape transport arrangement which is adapted to be utilized with tapes having deformable mediums of different viscosities coated thereon.

Another object of this invention is to provide a relatively simple and inexpensive arrangement for controlling the transport rate of a tape in a light valve projection apparatus.

In accordance with the present invention, a tape transport arrangement including a supply roll of tape is provided for a light valve apparatus. Means are provided for applying a tension to the tape for causing the roll of tape to unwind, and means are provided for heating the tape supply roll. A turn of tape being unwound forms an interstice with the body of the roll at a point of departure from the roll. In one embodiment of the invention, heater means are positioned proximate to the interstice and are adapted for heating the deformable medium on the tape at the interstice. Heating of the medium increases the temperature of the medium, reduces its viscosity, and thereby facilitates its unwinding and avoids the disadvantages hereinbefore enumerated.

In accordance with another feature of the present invention, means apply a constant unwinding tension to the tape. The heater means are adapted to heat the medium on the tape to a temperature for providing a desired viscosity and corresponding unwinding rate for the tape. Thus, a speed control for unwinding and transporting the tape is provided.

Figure 4:
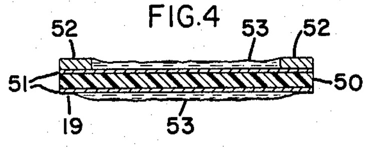
Figures 5, 7:
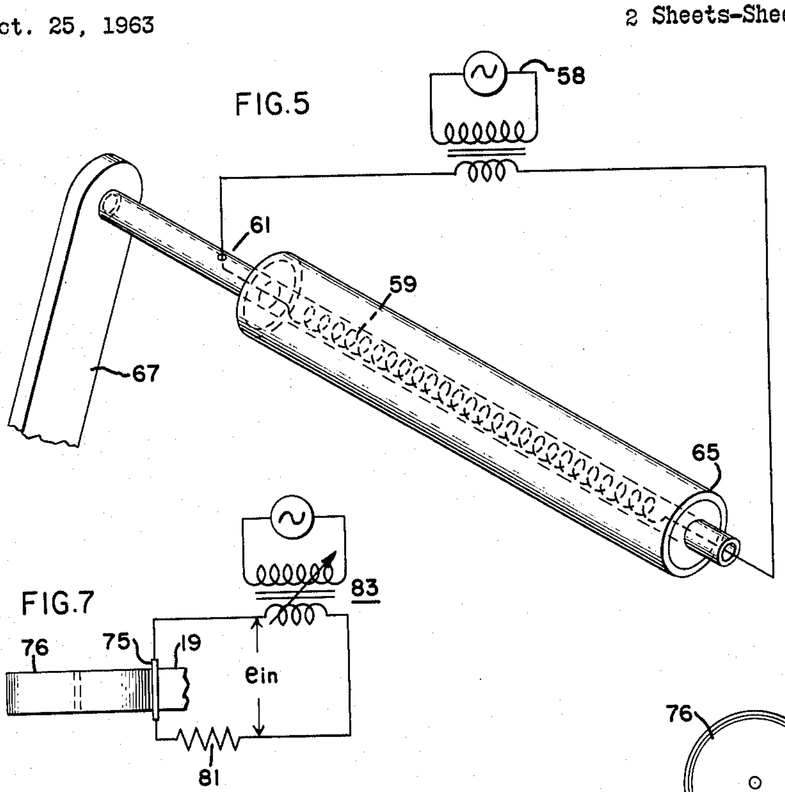
Figure 6:
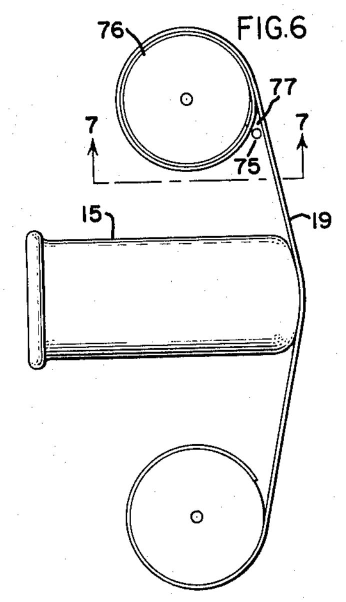
Figure 8:
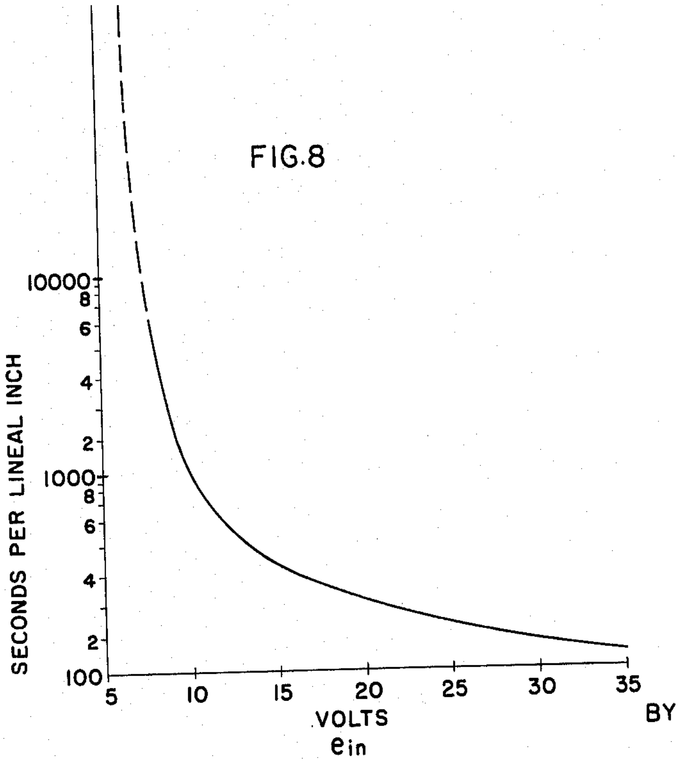

Further objects, features, and the attending advantages of the invention will be apparent with reference to the following specification and drawings in which:

FIGURE 1 is a view of an electron discharge device for a light valve projector apparatus which illustrates one embodiment of the present invention, FIGURE 2 is a plan view of the discharge device of FIGURE 1, FIGURE 3 is a front view of the discharge device of FIGURE 1, FIGURE 4 is a sectional view taken along lines 4—4 of FIGURE 3 and illustrates the composition of the transport tape, FIGURE 5 is a detailed perspective view of a heater means utilized in the embodiment of the invention illustrated in FIGURE 1, FIGURE 6 is a view of a portion of the device of FIGURE 1 and illustrates another embodiment of the present invention, FIGURE 7 is a view taken along lines 7—7 of FIGURE 6, and FIGURE 8 is a diagram illustrating the operational characteristics of one form of the embodiment of the invention illustrated in FIGURE 6.

Referring now to FIGURES 1, 2 and 3, a brief description of an electron discharge device 10 of the light valve projector apparatus will be given. Although the present invention will be described with reference to a light valve projection apparatus, other light valve apparatus may equally well utilize the features of the invention. For example, one such other apparatus is a thermoplastic recording apparatus. The electron discharge device 10 comprises an evacuated glass envelope having the general configuration of a mallet and includes a maul section 11 and a handle section 13. A glass wall surface of the maul section includes an integral portion which defines a reenterent cavity 15 having an output window 17 at an end closure of the cavity. A transport tape 19 which is unwound from a supply roll 21 is drawn along an inner surface of the window 17 and stored by a take up reel 23. The roll 21 is wound upon a reel form 24 which is rotatably mounted on an axle 25 while the reel 23 is secured to a drive shaft 27. An electric motor 29 which derives electrical energy from a source 31 via a transformer 33 and vacuum sealed feedthrough terminals 35 and 37 is mechanically coupled to shaft 27 and causes the shaft and reel 23 to rotate. The tape transport apparatus comprising the described reels, tape, and drive is supported and secured in position by support rods 39 and 41 respectively, which are welded to plates 43. A plurality of rivets 45 are vacuum sealed to the glass surface of the maul section 11 and mount the plates 43 to the inner surface of the glass envelope.

An electron beam 46 is derived from a cathode electrode 47 and is accelerated toward the tape 19. Accelerating potential is provided by a source 48 which is coupled between the cathode and tape.

Means, not shown, are provided and positioned in the maul section 13 for focusing the electron beam, for modulating the beam, and for deflecting the beam across the surface of the tape 19 in the area of the output window 17. The beam impinges a medium which is coated on the tape and forms gratings on the surface of the medium. Light rays from a source 49 are projected upon the medium and a Schlieren optical system, not shown, projects an image representative of modulation intelligence upon an external screen.

As best seen in the cross-sectional view of the tape in FIGURE 4, the tape arrangement comprises an elongated strip of transparent tape 50, a transparent conductive substrate 51 which is deposited on the tape 50, strips 52 forming extending edges for the tape, and a deformable medium 53 which is to be replenished and which is coated on the substrate 51 intermediate the edges 52. The medium 53 may comprise a material having a relatively high viscosity at 25° C. and which because of adhesive forces exerted by the medium on the tape would require a relatively high tension for unrolling at this temperature. As is indicated hereinbefore, unrolling a tape with a relatively high viscosity medium coated thereon often creates rivulets which provide deleterious effects on an image which is to be reproduced. At times, the adhesive forces are of a magnitude which cause the tape to be damaged upon unrolling.

In accordance with a feature of this invention, means are provided and positioned in proximity to the roll of tape for heating the medium, lowering its viscosity, and thereby reducing the tension required to unroll the reel of tape and eliminating the creation of rivulets and damage to the tape. The means, in one embodiment of the invention, comprises heater means positioned in proximity to an interstice 55 of the roll. In one form, the heater means may be electrically energized and comprise a heater element 57 and a source of electrical energy 58, shown in FIGURE 3, for causing a current to flow in the heater element and dissipate electrical energy therein for raising the temperature of the element.

The diameter of the roll of tape illustrated in FIGURE 1 will vary and the distance of the interstice 55 from the axle 25 will similarly vary. In accordance with another feature of this invention, means are provided for automatically maintaining the heater element proximate to the interstice as the distance between the interstice and the axle varies. One such means is illustrated in FIGURES 1, 2, 3 and in an enlarged form in FIGURE 5. The heater element 57 comprises a wire of resistance material 59 positioned on an insulating form 61 which may be fabricated of ceramic or other suitable material. Positioned about the form 61 and rotatably mounted thereto by bearings is a tubular roller element 65. Support form 61 is secured to a pivotally mounted arm 67. A spring 71 is connected to the bracket 39 and the arm 67 and urges the heater 57 in the direction of the moving interstice. Current flowing in the wire 59 heats the wire which in turn heats the element 65. A surface of the roller 65 makes physical contact with the tape near the interstice 55 as shown in FIGURE 1 and heats the medium 53 at this point. Simultaneously, the tape is drawn from the supply roll 21 without interference by the heater element since the tubular element 65 will rotate on its bearings. As the interstice moves towards the axle 25 a force exerted on the heater element form 61 by the spring 71 urges the heater element in the direction of the moving interstice. Thus an arrangement has been described which permits the use of high viscosity deformable mediums in a tape transport arrangement while avoiding the necessity of providing an excessively large tension on the tape. The creation of rivulets or damage to the tape is hence eliminated.

In some tape transport arrangements, the tape supply reel may have a relatively large diameter with a relatively small supply of tape wound thereon. The interstice travels a negligibly small distance in the direction of the axle as the supply roll is unwound and a heater element which is fixedly mounted can advantageously be utilized. An arrangement of this type is illustrated in FIGURES 6 and 7 wherein the heater element 75 may comprise a piece of resistance wire which is secured to the bracket 39 by an insulating support, not shown. The reel 76 has a relatively large diameter and the interstice 77 will have negligible movement.

In accordance with another feature of the present invention, means are provided in addition to the heater means for exerting a tension of relatively constant value on the transport tape for causing it to unroll from its supply reel. Such a means may comprise an electric motor having a constant torque or a spring drive mechanism having a conventional escapement mechanism for providing a constant output torque. The amplitude of current flowing through the heater element is selected to heat the medium to a desired temperature for regulating the viscosity and thus the speed at which the tape is unwound.

While it will be understood that the values of various components may vary in order to satisfy desired requirements, the following components and the indicated parameters have been found to provide satisfactory operation in an embodiment of the present invention. The tape 50 as shown in FIGURE 1 is comprised of a polyester tape known commercially as Cronor. The tape is 35 mm. wide and has a transparent conducting film 51 of indium-oxide approximately 400 Angstroms thick deposited on both sides of the tape. Edges 52 comprise ribbons of polyvinylacetate having a thickness of 20 microns and a width of 4 mm. Twenty microns of an electron deformable medium comprising a dielectric polymer was applied to the indium-oxide surface between the edges 52 at a temperature of 90° C. and at which temperature the dielectric polymer is of sufficiently low viscosity to be readily applied to the surface of the indium-oxide 51. The tape was formed into a roll at 90° C. and allowed to cool. The roll when cooled at 25° C. formed a rigid mass of material. At 25° C. the medium 53 had a viscosity on the order of 5 to $20\times10^6$ centistoke. When an unwinding force of approximately 5.2 ounces is applied to this tape in the embodiment of FIGURE 6 the roll does not unwind.

The heater element 75 of FIGURE 6 which was mounted upon an insulating support comprised a nichrome resistance wire having a 15 mil diameter, a length of 3 inches, and a resistance of .4 ohm. A resistor 81 having a resistance of approximately 14.6 ohms is connected in series with the nichrome wire 75. A tension of approximately 5 ounces was applied to the tape by the motor 29. The medium at the heated interstice increased in temperature, the viscosity decreased, and the tape unrolled when a voltage $e_{in}$ existed across the secondary terminal of the transformer 83 of FIGURE 7. FIGURE 8 is a diagram illustrating the variation in the unwinding rate and therefore the tape transport rate when the amplitude of a voltage $e_{in}$ applied to the circuit is varied and a constant unwinding force of approximately 5 ounces is applied to the tape. The ordinate indicates the number of seconds required to unwind a linear inch of tape.

While I have illustrated and described and have pointed out in the annexed claims certain novel features of my invention, it will be understood that various omissions, substitutions, and changes in the forms and details of the system illustrated may be made by those skilled in the art without departing from the spirit of the invention and the scope of the claims.

What I claim is:

1. In a light valve apparatus, a tape transport arrangement comprising: a strip of tape formed into a supply roll; said tape having a deformable medium of viscosity $\eta$ supported thereon making unwinding of said tape difficult; means for applying heat to said roll of tape for decreasing the viscosity $\eta$ of said deformable medium; and means for exerting a force on said strip of tape for causing said roll of tape to unwind with less tension upon the application of said heat.

2. In a light valve apparatus, a tape transport arrangement comprising: a strip of tape formed into a roll; said tape having a deformable medium of viscosity $\eta$ supported thereon making unwinding of said tape difficult; said roll having an interstice formed by a turn of the strip of tape and the body of said roll; means for applying heat to said roll of tape for decreasing the viscosity of said deformable medium at the interstice; and means for exerting a force on said strip of tape for causing said roll of tape to unwind with less tension upon the application of said heat.

3. The apparatus of claim 2 wherein said means for applying heat to said roll is arranged to apply heat to said medium at said interstice.

4. In a light valve apparatus, a tape transport arrangement comprising: a strip of tape formed into a circular roll having a plurality of overlapping turns; said tape having a deformable medium of viscosity $\eta$ supported thereon making unwinding of said tape difficult; said roll having an interstice formed at a junction of an outer turn and a body of said roll of tape; means for rotatably mounting said roll of tape; an electrically energized heater element positioned adjacent said interstice for heating the deformable medium at said interstice; and means for exerting a force on said strip of tape for causing said roll of tape to unwind with less tension upon the application of said heat.

5. The tape transport arrangement of claim 4 wherein said heater element includes a roller surface and said roller surface contacts said tape adjacent said interstice.

6. The tape transport arrangement of claim 4 including means for automatically changing the position of said heater element in a manner for maintaining the relative adjacent positioning of said heater element with respect to said interstice.

7. In a light valve apparatus, a speed control for a tape transport arrangement comprising: a strip of tape formed into a roll; said tape having a deformable medium of viscosity $\eta$ supported thereon making unwinding of said tape difficult; means rotatably mounting said roll; means for applying an unwinding force of substantially constant magnitude to said tape; and heater means for lowering the viscosity $\eta$ of said medium for controlling the unwinding rate of said roll upon lowering of said viscosity.

8. In a light valve apparatus a speed control for a tape transport arrangement comprising: a strip of tape formed into a roll; said tape having a deformable medium of viscosity $\eta$ supported making unwinding of said tape difficult; said roll having an interstice formed by a turn of the strip of tape and the body of said roll; means rotatably mounting said roll; means for exerting an unwinding force of substantially constant magnitude upon said tape; and electrical means for heating said roll of tape adjacent said interstice to lower said viscosity $\eta$ and for causing said tape to unroll at a selected rate upon lowering of said viscosity.

9. In a light valve apparatus, a speed control for a tape transport arrangement comprising: a strip of tape formed into a circular roll having a plurality of overlaying turns; said tape having a deformable medium of viscosity $\eta$ supported thereon making unwinding of said tape difficult; said roll having an interstice formed at a juncture of an outer turn and a body of said roll of tape; means for rotatably mounting said roll of tape; means for exerting an unwinding force of constant magnitude upon said strip; a heater element positioned adjacent said interstice for heating the deformable medium at said interstice; means including a source of electrical energy coupled to said heater element for causing a heating current to flow in said element; said heating current having a magnitude adjusted to cause said roll to unwind at a selected rate.

References Cited by the Examiner

UNITED STATES PATENTS

| | | | |
|---|---|---|---|
| 2,401,841 | 6/1946 | Singer | 219—214 |
| 2,483,715 | 10/1949 | Solon | 219—214 |
| 3,026,397 | 3/1962 | Wolze | 263—3 X |
| 3,038,982 | 6/1962 | Ludlow | 219—214 |

MERVIN STEIN, *Primary Examiner.*

W. S. BURDEN, *Assistant Examiner.*